US012394933B2

(12) United States Patent
Marbach et al.

(10) Patent No.: US 12,394,933 B2
(45) Date of Patent: Aug. 19, 2025

(54) ELECTRICAL CABLE INSULATOR ASSEMBLY

(71) Applicant: POWER FEED-THRU SYSTEMS AND CONNECTORS LLC, Deer Park, TX (US)

(72) Inventors: Brandon Marbach, Spring, TX (US); Roy Kinkaid, Baytown, TX (US); James Patrick Payne, League City, TX (US); Albert George Ollre, V, Houston, TX (US)

(73) Assignee: POWER FEED-THRU SYSTEMS AND CONNECTORS LLC, Deer Park, TX (US)

( * ) Notice: Subject to any disclaimer, the term of this patent is extended or adjusted under 35 U.S.C. 154(b) by 309 days.

(21) Appl. No.: 17/817,876

(22) Filed: Aug. 5, 2022

(65) Prior Publication Data

US 2023/0092719 A1 Mar. 23, 2023

Related U.S. Application Data

(60) Provisional application No. 63/202,334, filed on Jun. 7, 2022.

(51) Int. Cl.

*H01R 13/502* (2006.01)
*E21B 33/03* (2006.01)
*H01R 13/52* (2006.01)
*H01R 13/533* (2006.01)
*H01R 13/621* (2006.01)
*H01R 13/622* (2006.01)

(52) U.S. Cl.

CPC ........... *H01R 13/521* (2013.01); *E21B 33/03* (2013.01); *H01R 13/502* (2013.01); *H01R 13/5202* (2013.01); *H01R 13/621* (2013.01); *H01R 13/622* (2013.01)

(58) Field of Classification Search

CPC .. H01R 13/42; H01R 13/502; H01R 13/5202; H01R 13/521; H01R 13/523; H01R 13/621; H01R 13/622

See application file for complete search history.

(56) References Cited

U.S. PATENT DOCUMENTS

| | | | | |
|---|---|---|---|---|
| 7,232,347 | B1 * | 6/2007 | Moore | H02G 15/113 174/89 |
| 8,382,508 | B1 * | 2/2013 | Frey | H01R 13/5205 439/461 |
| 9,941,622 | B1 * | 4/2018 | Campbell | E21B 17/028 |
| 10,326,215 | B1 * | 6/2019 | Anderson | H01B 7/046 |
| 10,502,004 | B2 * | 12/2019 | Knapp | E21B 17/003 |
| 2016/0149335 | A1 * | 5/2016 | Broughton | H01R 43/005 439/587 |
| 2017/0175476 | A1 * | 6/2017 | Painter | H01R 13/629 |
| 2018/0163902 | A1 * | 6/2018 | Manning | F16J 15/0887 |
| 2019/0085644 | A1 * | 3/2019 | Ames | E21B 17/028 |
| 2020/0102796 | A1 * | 4/2020 | Anderson | E21B 33/0385 |
| 2020/0124058 | A1 * | 4/2020 | Wade | E21B 33/03 |

* cited by examiner

*Primary Examiner* — Abdullah A Riyami
*Assistant Examiner* — Thang H Nguyen
(74) *Attorney, Agent, or Firm* — Alexander B. Uber; Gray Reed

(57) ABSTRACT

An improved wellhead electrical connection assembly utilizing multiple sealing mechanisms to minimize pressure and fluid leakage without reliance on epoxies or other sealants. The assembly utilizes upper and lower sealing systems to provide protection at both ends of the electrical connection.

8 Claims, 22 Drawing Sheets

ELECTRICAL CABLE INSULATOR ASSEMBLY

CITATION TO PRIOR APPLICATIONS

The present application is a continuation of and claims priority to U.S. Provisional Application No. 63/202,334, titled "Electrical Cable Insulator Assembly" and filed Jun. 7, 2021.

BACKGROUND AND SUMMARY

Wellhead penetrators are purposed to allow electrical power to be delivered down a well from a surface source. As a result, wellhead penetrators play an integral role in many wellhead operations. Penetrators incorporate sealing mechanisms to prevent well fluids and gases from escaping upward toward the surface as well as environmental fluids (such a rain) or well fluid seepage from escaping downward into the well. Accordingly, conventional wellhead penetrators attempt to incorporate various sealing elements to achieve these ends and maintain a viable electrical connection. Conventional penetrators often rely on epoxies or other packed or injected sealants. However, consistent with other wellhead components and structures, a wellhead penetrator can sometimes become exposed to the high-pressure environment that arises within a producing well. These conventional approaches are not suitable for reliable and consistent results (particularly for preventing fluid or gas ingress) in high pressure environments.

A penetrator assembly in accordance with the present disclosure creates an improved sealed connection between a surface-originating power cable and an electric submersible pump ("ESP") (or other similar technology) cable by providing a gas-blocking seal at pressures up to 5,000 psi from below and above the penetrator using materials well-suited for hydrocarbon environments resulting in a greater run-life relative to conventional epoxy seals.

DETAILED DESCRIPTION

This description, with references to the figures, presents non-limiting examples of embodiments of the present disclosure.

Embodiments of this disclosure relate generally to an improved wellhead electrical connection assembly that may be used, for example, in oil and gas operations. Some embodiments of such an improved wellhead electrical connection assembly include a penetrator assembly.

Figure 2:
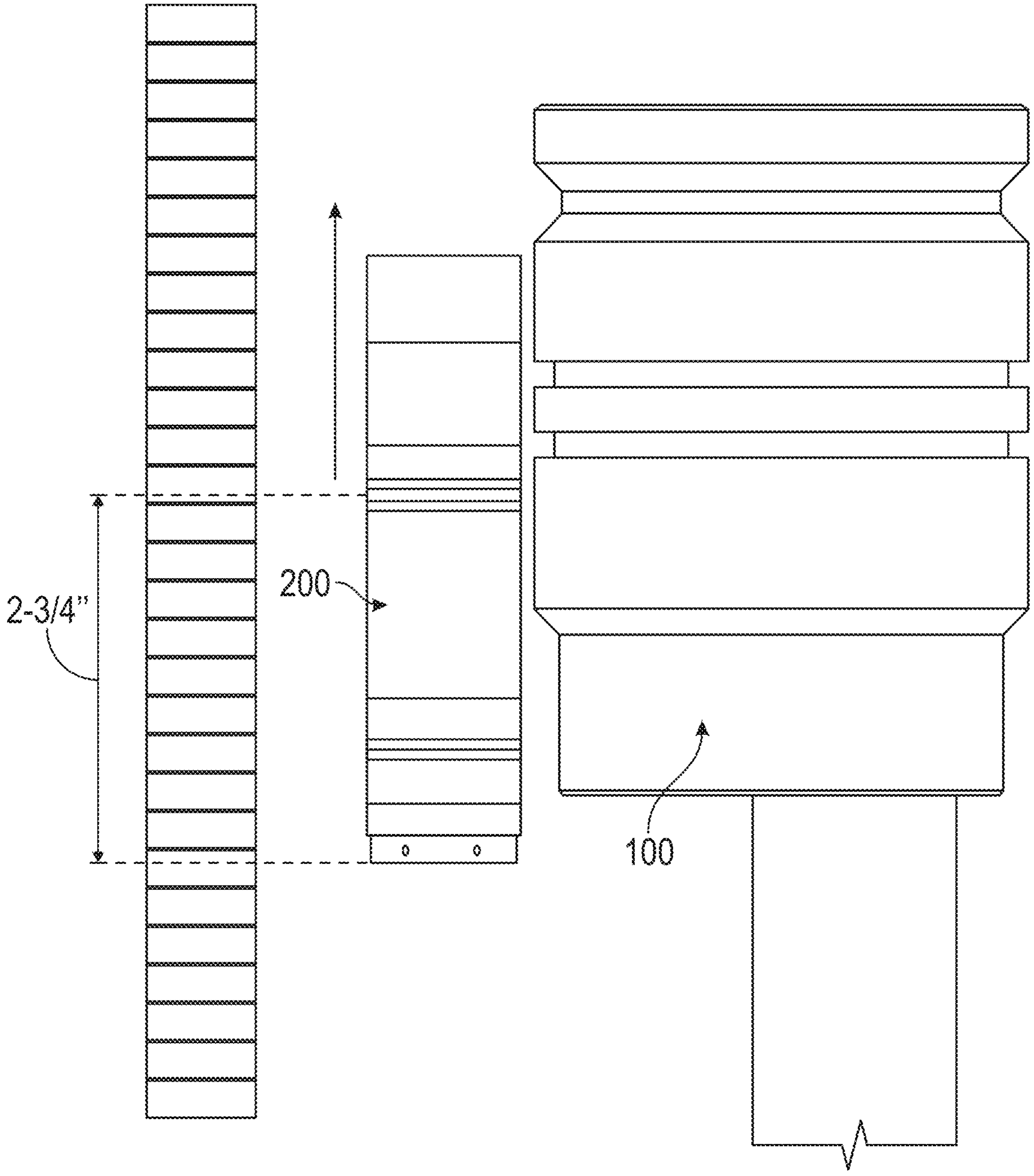
FIG. 2 depicts a side view of a conventional tubing hanger and a penetrator assembly in accordance with various embodiments of the present disclosure.
Figure 3:
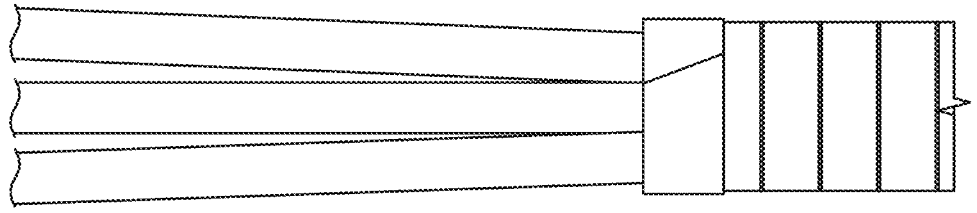
FIG. 3 depicts a side view of an ESP cable prepared in accordance with various embodiments of the present disclosure.
Figure 4:
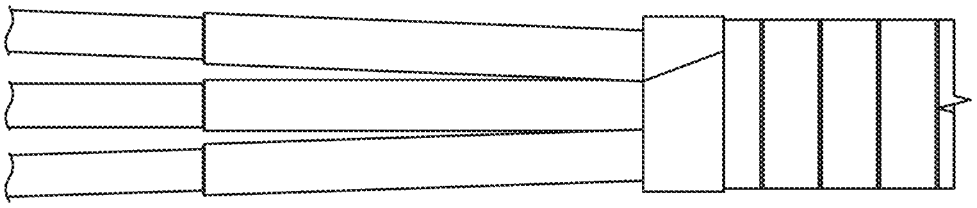
FIG. 4 depicts a side view of an ESP cable prepared in accordance with various embodiments of the present disclosure.
Figure 5:
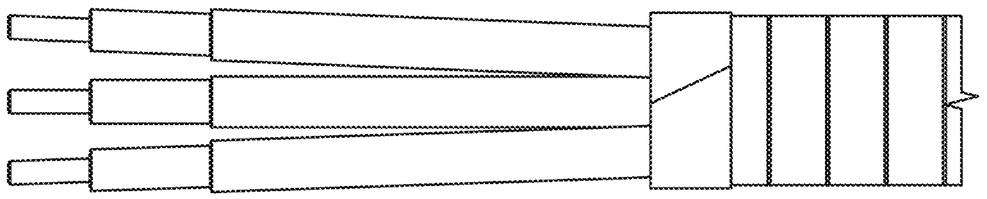
FIG. 5 depicts a side view of an ESP cable prepared in accordance with various embodiments of the present disclosure.
Figure 6:
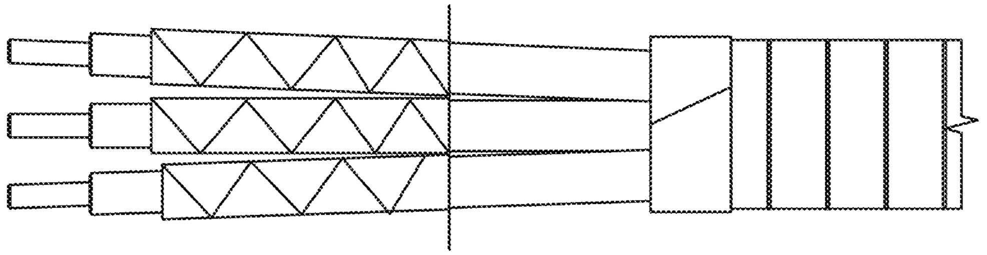
FIG. 6 depicts a side view of an ESP cable prepared in accordance with various embodiments of the present disclosure.

As shown in FIG. 2, several approaches according to embodiments of this disclosure (and even conventional approaches often) utilize a tubing hanger 100 having a penetrator assembly disposed therein. These penetrator assembles are used to facilitate a connection between an external power source and downhole apparatus, such as ESPs. Tubing hangers are often configured to receive a penetrator assembly in a designated volume 110 such as a feed-thru pocket in the tubing hanger.

Figure 1:
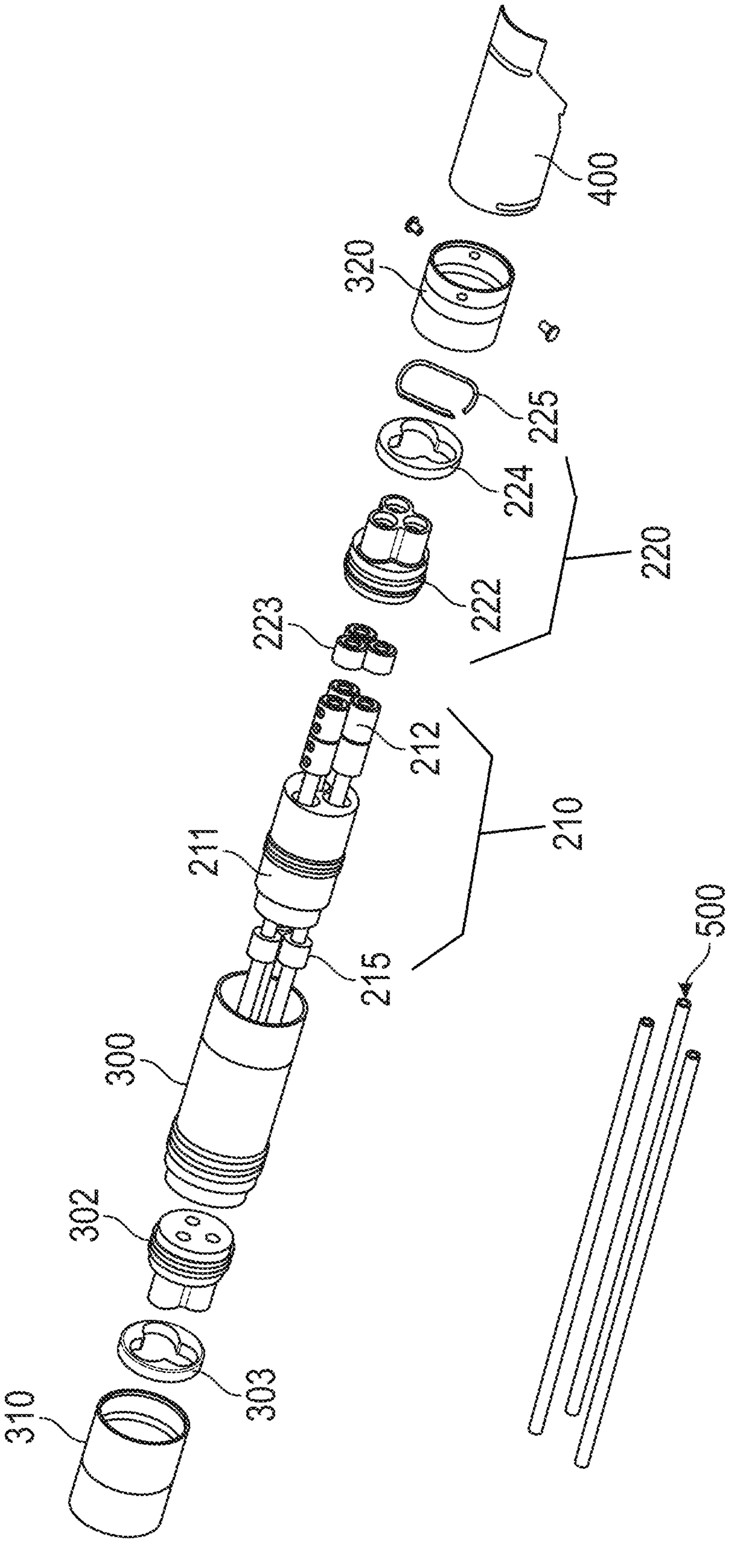
FIG. 1 depicts an exploded view of a penetrator assembly in accordance with various embodiments of the present disclosure.
Figure 23:
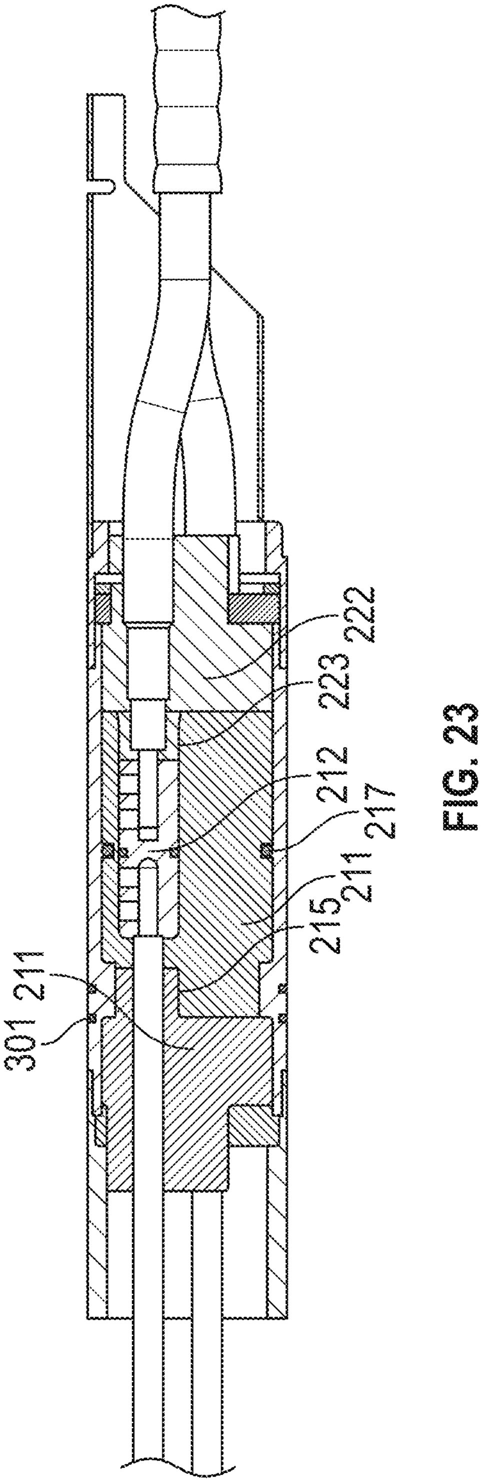
FIG. 23 depicts a cutaway side view of a penetrator assembly in accordance with various embodiments of the present disclosure.
Figure 24:
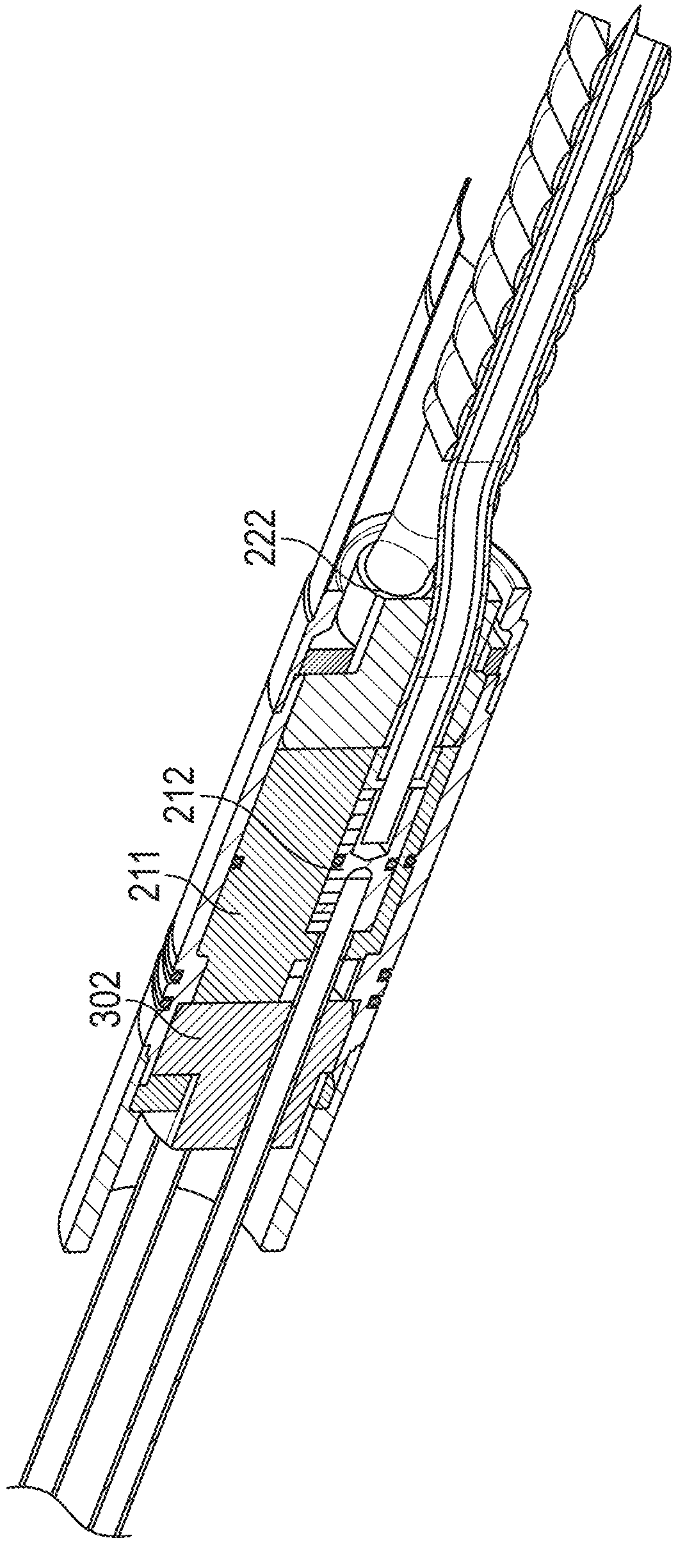
FIG. 24 depicts a cutaway perspective view of a penetrator assembly in accordance with various embodiments of the present disclosure.

In certain embodiments of the present disclosure, as illustrated in FIGS. 1, 23, and 24, a penetrator assembly 200 may have an upper assembly 210 and a lower assembly 220. Upper assembly 210 may include an upper body 211 and at least one conductor receiver 212. Upper body 211 may be substantially formed of polyetheretherketone (PEEK) or other suitable insulating material. Upper body 211 may be configured with a first upper groove on an upper body exterior face to receive a first outer sealing element 217. First outer sealing element 217 may be an elastomeric O-ring. First outer sealing element 217 is configured to minimize any potential fluid flow beyond its position on the exterior surface of upper body 211. Each of the at least one conductor receiver 212 may include a conductor retention element 213. Each of the at least one conductor receiver 212 may be a copper lug. Each of the at least one conductor receiver 212 may be configured with a first female end and a second female end positioned opposite one another wherein the first and second female end are each configured to receive a conductor. Conductor retention element 213 may be at least one set screw which may be tightened to securely retain any conductor that is received within the conductor receiver 212. Upper assembly 210 may be configured to receive at least one external power cable 214. At least one nose sealing element 215 may also be included in upper assembly 210. Lower assembly 220 may include a primary lower sealing element 222, at least one secondary lower sealing element 223, and a follower 224. Lower assembly 220 is configured to be installed on at least one ESP cable 400. Each conductor of each of at least one ESP cable 400 may be passed through primary lower sealing element 222. Each conductor of each of at least one ESP cable 400 may pass through one of said at least one secondary lower sealing element 223. Lower assembly 220 may further include a spring element 225. Spring element 225 may be a wave spring.

Prior to installation into lower assembly 220 each conductor of the at least one ESP cable 400 may be configured for insertion into lower assembly 220. As depicted in FIGS. 3-6, an exemplary ESP cable may include layers including armor. Any exterior armor may be carefully cut and secured in place by wrapping the cut site two times with high-modulus tape. Any conductors to be inserted into lower assembly 220 may be spread apart from each other with any tape and/or braid removed. The cable and conductors should be examined for damage. At this stage, the cable length may also be confirmed to ensure proper dimensions relative the production tubing. Any lead sheath or other barrier may be stripped back from each conductor while avoiding any cutting or damaging of the primary insulation. Any burrs on the lead may be removed or smoothed. Cable and conductor damage should again be checked for. Any insulation on each conductor may be stripped back. The ends of each conductor may be penciled or tapered before the insulation is abraded. Each conductors should be thoroughly cleaned before installation. For additional conductor protection, high-modulus tape may be used to wrap each conductor, for example, from between any remaining insulation to a point on any remaining lead sheath or other barrier. The tape be applied with 50% overlap and half-stretch starting from the point on the any remaining barrier to a point on the any remaining insulation and back to the point on the remaining barrier. Any excess tape should be carefully cut and removed.

Figure 7:
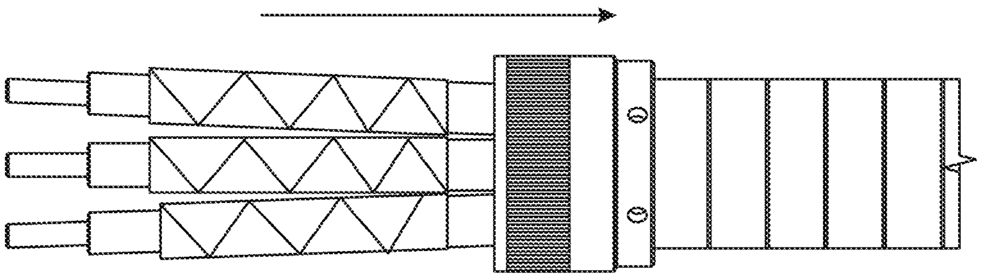
FIG. 7 depicts a side view of a lower penetrator cap and an ESP cable prepared in accordance with various embodiments of the present disclosure.
Figure 8:
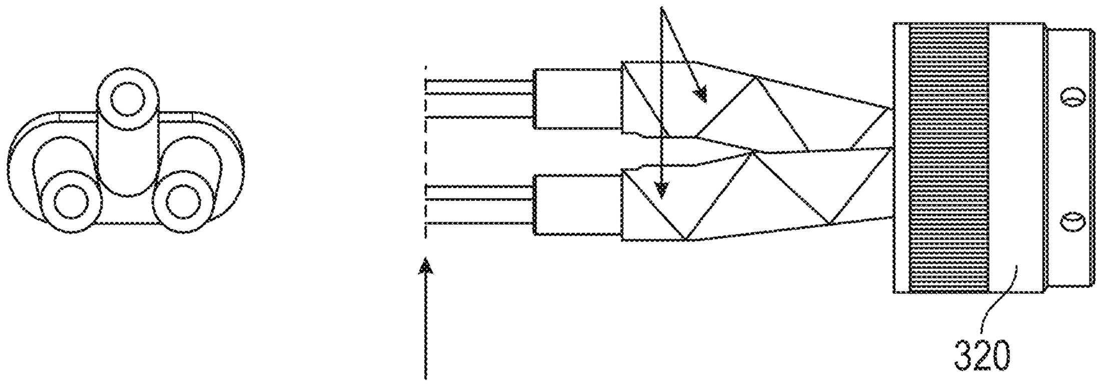
FIG. 8 depicts views of a lower penetrator cap and an ESP cable prepared in accordance with various embodiments of the present disclosure.

Depicted in FIGS. 7 and 8, as the conductors are passed through lower penetrator cap 320, each conductor leg may be bent in a substantially triangular pattern such that the conductors may be fitted into primary lower sealing element 222. As shown in FIG. 8, the lower conductor legs are bent slightly downward relative the upper conductor leg while the upper conductor leg is bent slightly upward relative the lower conductor legs. Care should be taken to avoid stressing or cracking any remaining lead sheath or other barrier. Additionally, the conductor legs should be substantially equally bent. This may be confirmed by examining any lead cuts, insulation cuts, and/or conductor ends of the conductor legs to verify that the respective sections of each conductor leg are substantially even with each other.

Figure 9:
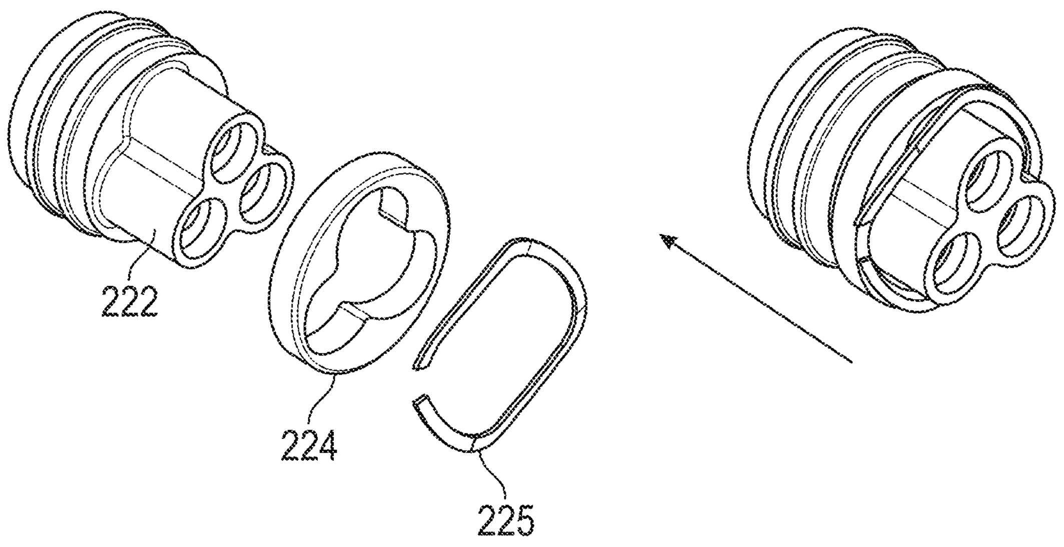
FIG. 9 depicts a perspective view of lower penetrator sealing elements in accordance with various embodiments of the present disclosure.
Figure 10:
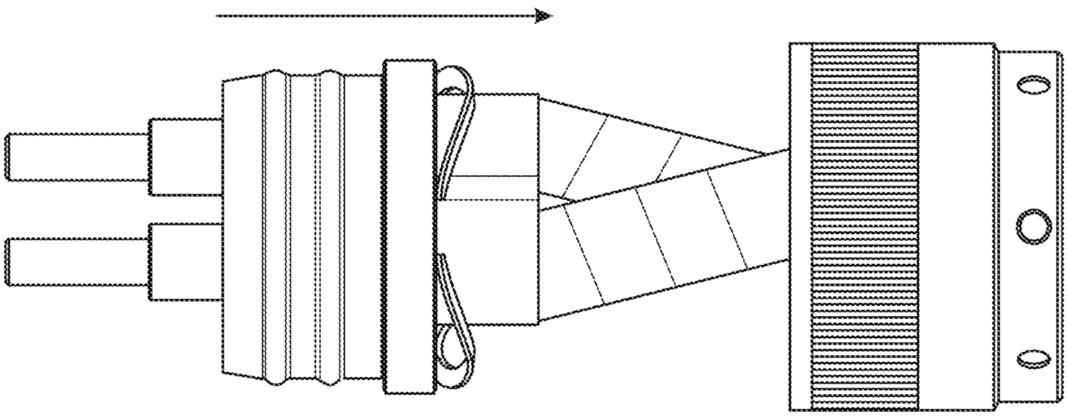
FIG. 10 depicts a side view of the installation of lower penetrator sealing elements in accordance with various embodiments of the present disclosure.
Figure 11:
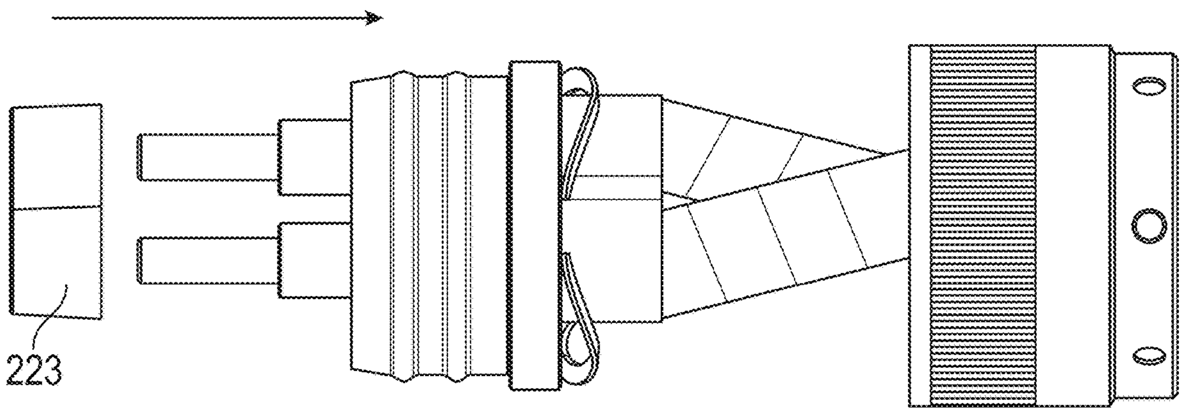
FIG. 11 depicts a side view of the installation of lower penetrator sealing elements in accordance with various embodiments of the present disclosure.

During an exemplary use, upper assembly 210 may be installed on three external power cables 214. First outer sealing element 217 is disposed on the exterior surface of upper body 211. Each external power cable 214 will be inserted through a nose sealing element 215 and into upper body 211 through to respective first female ends of each lug 212 as seen in FIG. 24. All three conductors from cables running from an ESP will be inserted through spring element 225, follower 224, and primary lower sealing element 222 as shown in FIGS. 9 and 10. Primary lower sealing element 222 is configured with a receptable for each of the three conductors. Each conductor may then be passed through a respective secondary lower sealing element 223 as shown in FIG. 11. To facilitate installation, an amount of dielectric grease may be applied on any remaining insulation and high-modulus tape for each conductor leg/phase. Each secondary lower sealing element 223 may come to rest against the face of any remaining exposed insulation of each respective conductor leg.

Figure 12:
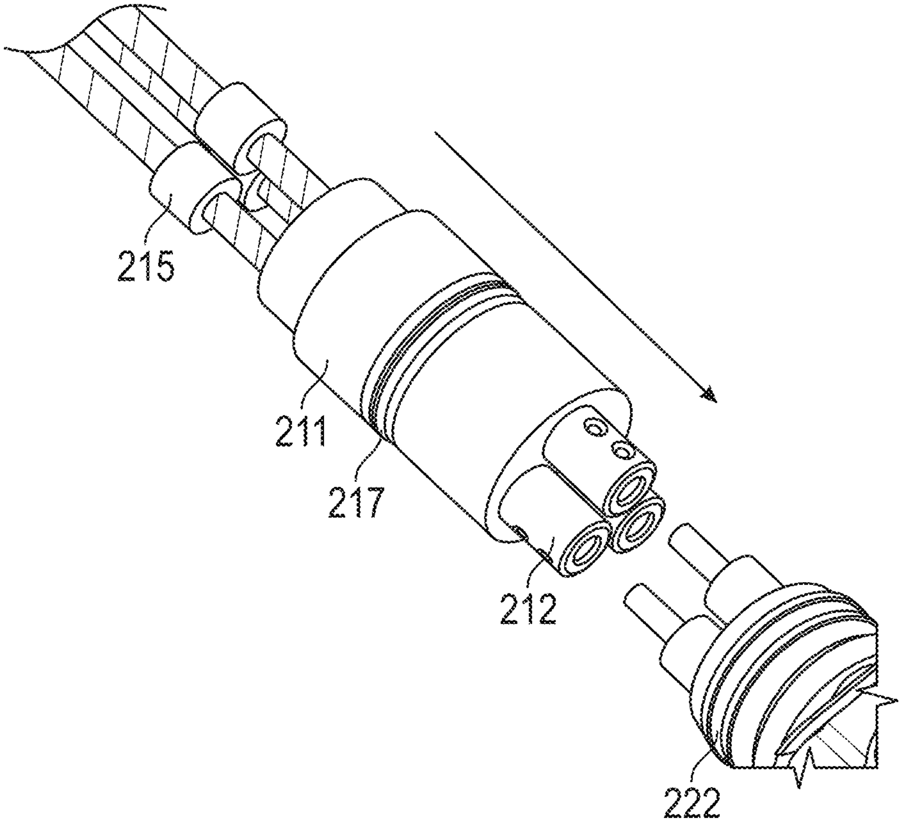
FIG. 12 depicts a perspective view of an upper body and lower sealing elements in accordance with various embodiments of the present invention.
Figure 13:
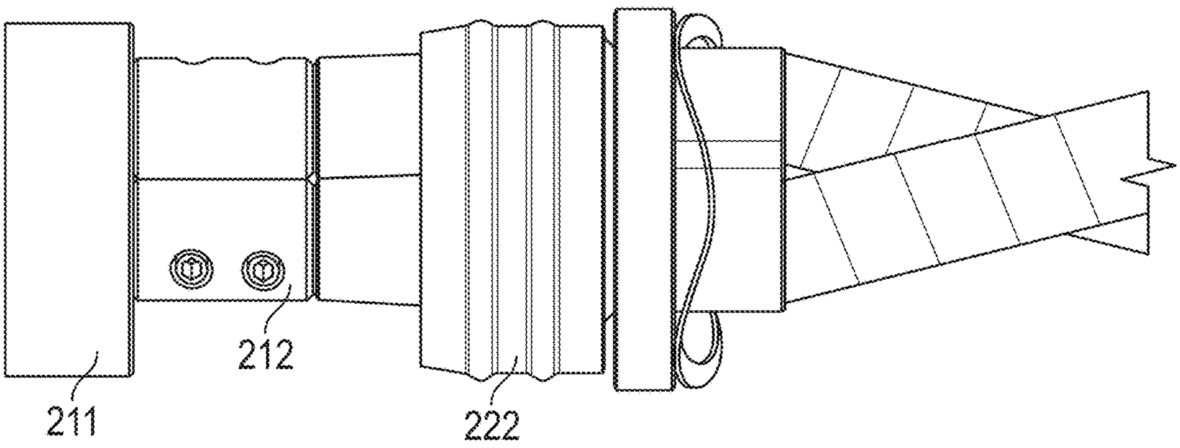
FIG. 13 depicts a side view of conductor receivers and lower sealing elements in accordance with various embodiments of the present disclosure.
Figure 14:
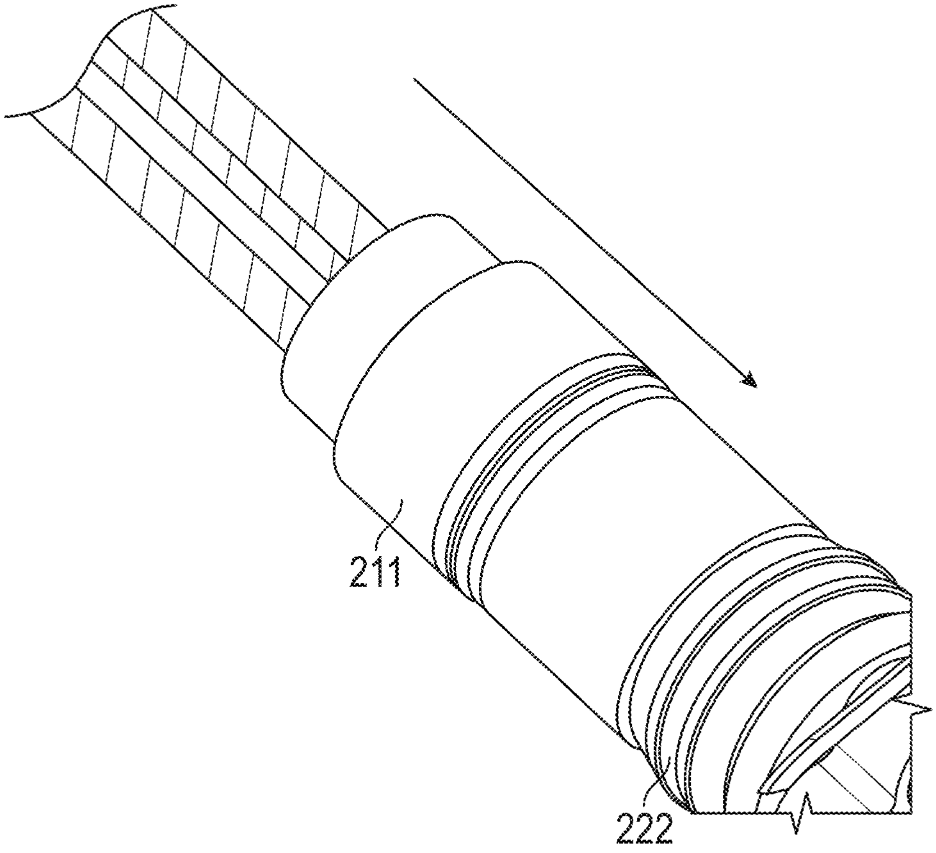
FIG. 14 depicts a perspective view of an upper body and lower sealing elements in accordance with various embodiments of the present invention.

To combine upper assembly 210 and lower assembly 220, each conductor of the three ESP cables is inserted into a respective second female end of each lug 212 which are exposed beyond a lower face 218 of upper body 211. Each lug 212 has two set screws to secure the inserted conductor from an ESP cable as shown in FIG. 12. Each set of the two set screws may be tightened to secure each conductor. An amount of dielectric grease may be applied to primary lower sealing element 222 and each secondary lower sealing element 223. Once the conductors have been inserted into the lugs, a witness mark may be made on the high-modulus tape just behind primary lower sealing element 222 as seen in FIG. 13. The witness mark may serve as a guide for proper connector assembly. There should be no gap between the mark and the back of the cable seal. If a gap exists, components have moved from their proper location. The assemblies should be repositioned in such a scenario. While the base of primary lower sealing element 222 near spring element 225 is held, the upper assembly 210 may be slid toward lower assembly 220. This action will cause lugs 212 to be pushed upward and into upper body 211 as depicted in FIG. 14. In some embodiments, each conductor receiver 212 may have an outer receiver sealing element (such as an elastomeric O-ring) to provide further sealing when at least partially contained in said upper body 211. The witness mark(s) should be reviewed to ensure proper component position has been maintained.

Figure 15:
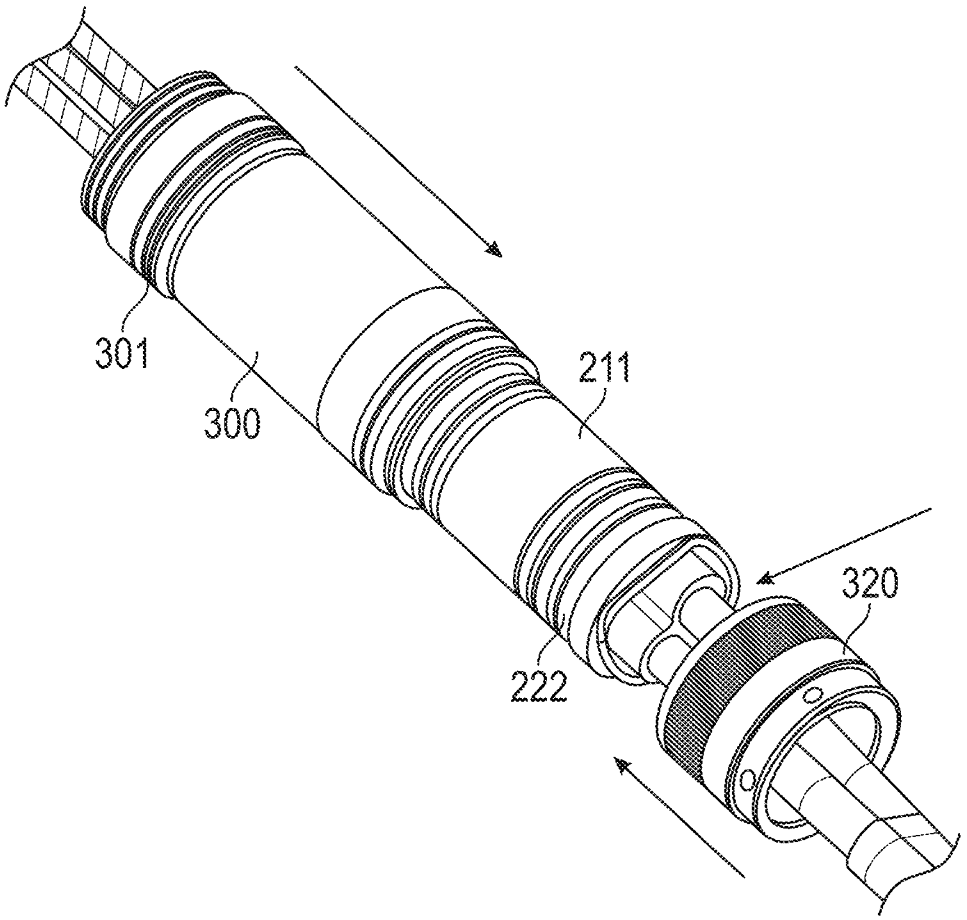
FIG. 15 depicts a perspective view of a partially assembled penetrator assembly in accordance with various embodiments of the present disclosure.
Figure 16:
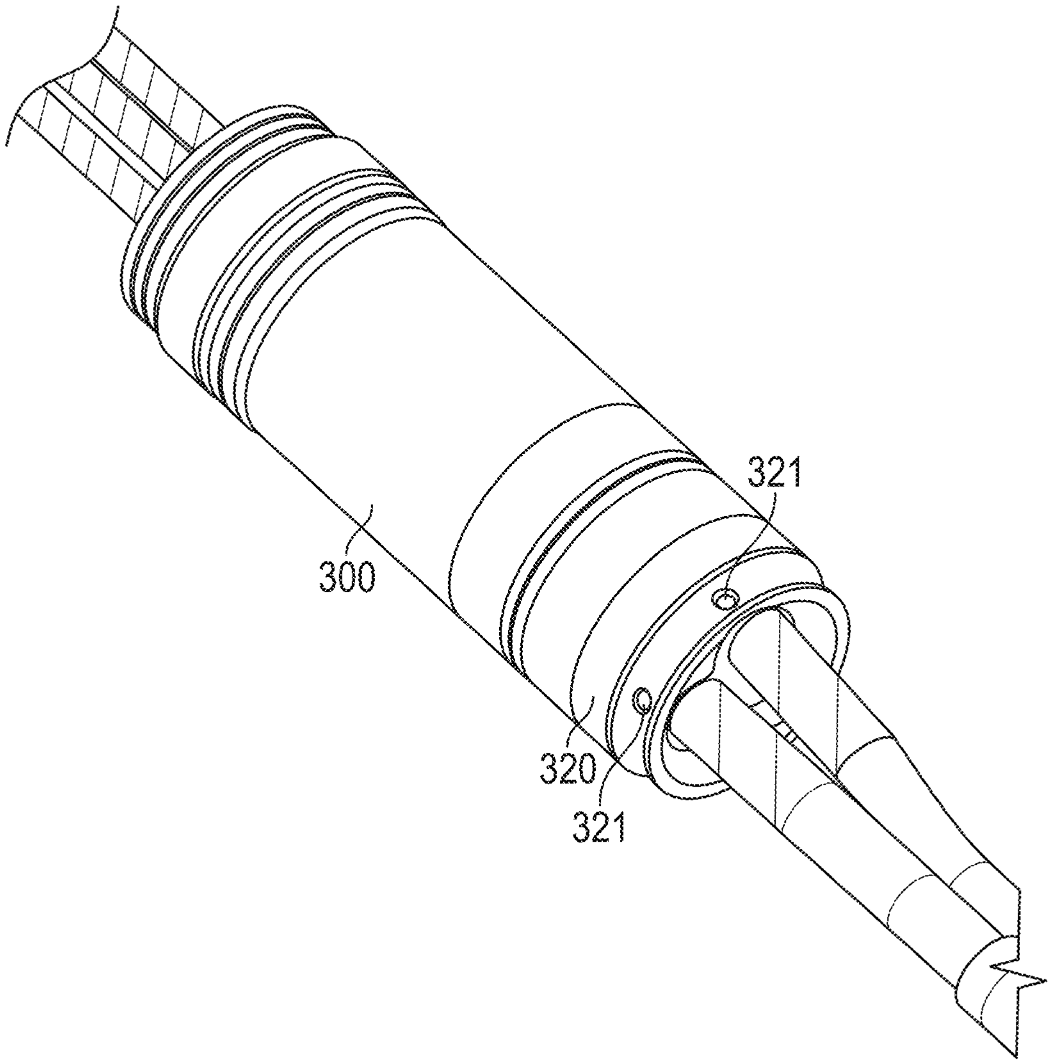
FIG. 16 depicts a perspective view of a penetrator housing element and lower penetrator cap in accordance with various embodiments of the present disclosure.
Figure 17:
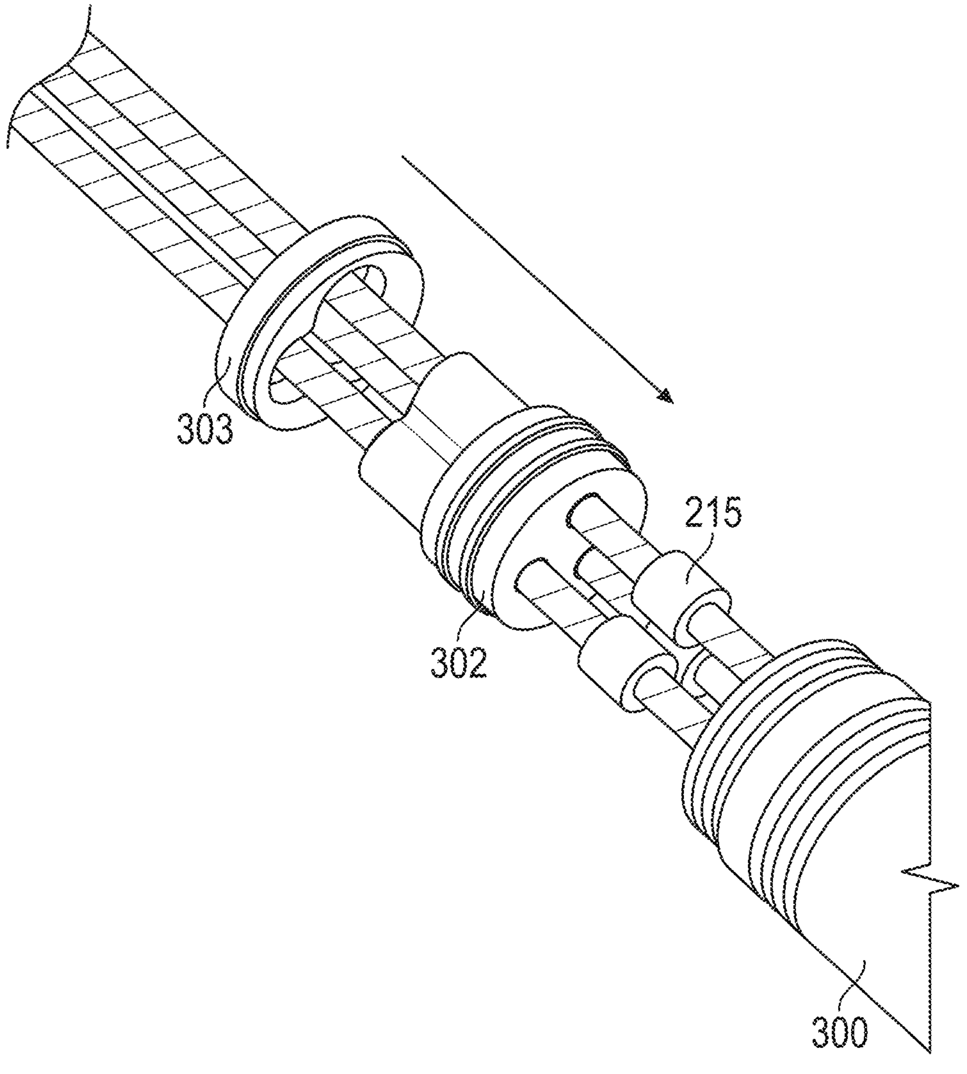
FIG. 17 depicts a perspective view of upper sealing elements in accordance with various embodiments of the present disclosure.
Figure 18:
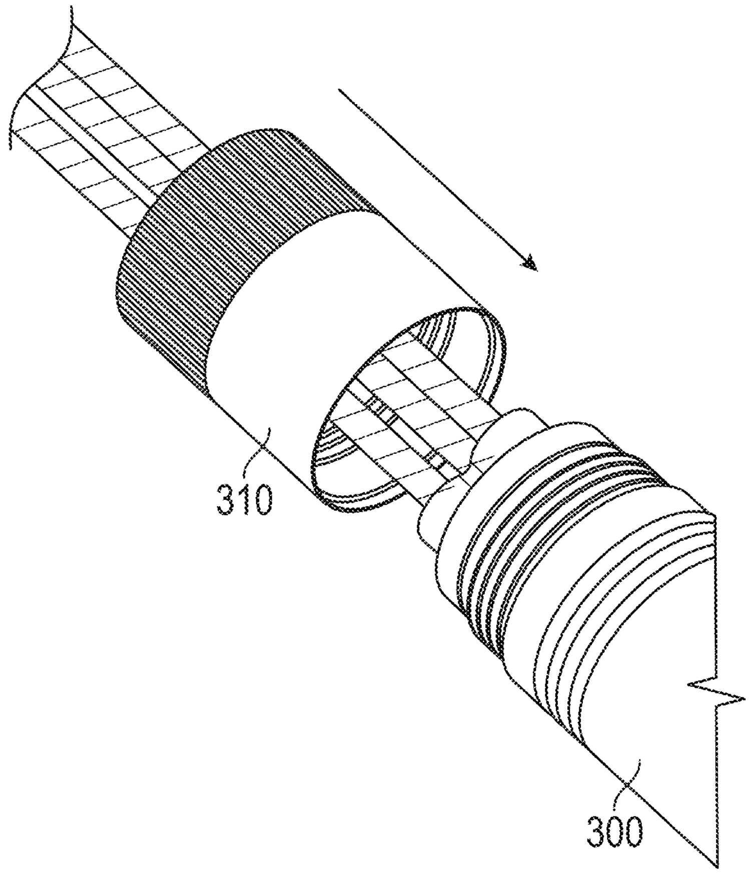
FIG. 18 depicts a perspective view of a partially assembled penetrator assembly in accordance with various embodiments of the present disclosure.

In further embodiments, as depicted in FIGS. 15-18, penetrator assembly 200 may further include a penetrator housing element 300, an upper penetrator cap 310, and a lower penetrator cap 320. Penetrator housing element 300 may be configured with one or more outer grooves to receive at least one second outer sealing element 301. Penetrator housing element 300 may also be configured to at least partially contain upper assembly 210 and lower assembly 220. Penetrator housing element 300 may be configured with an upper threaded portion 304 and a lower threaded portion 305. These threaded portions may be used to facilitate threaded engagement with upper penetrator cap 310 and lower penetrator cap 320. Additionally, these threaded portions may be positioned on the external surface of penetrator housing element 300. Upper penetrator cap 310 may be configured with first threaded portion 311. First threaded portion 311 may be positioned on the internal surface of a first end of upper penetrator cap 310 and be configured for engagement with upper threaded portion 304 of penetrator housing element 300. Lower penetrator cap 320 may be configured with a lower cap threaded portion 321 configured for engagement with lower threaded portion 305 of penetrator housing element 300. As shown in FIG. 17, penetrator assembly 200 may also include a primary upper sealing element 302 and upper sealing follower 303. Conductors from external power cable 214 may be passed through upper penetrator cap 310 before passing through upper sealing follower 303 and upper sealing element 302. Each conductor of an external power cable may be inserted into a corresponding aperture of upper sealing element 302.

Returning to the exemplary use scenario set out above, the additional components of an embodiment of the present disclosure can be incorporated as follows. A penetrator housing element 300, which the external power cables may have been passed through before passing through upper assembly 210 and having two installed secondary outer sealing elements, may then be slid down and onto upper assembly 210. This can be achieved by holding primary lower sealing element 222 and sliding penetrator housing element 300 over upper assembly 210. An amount of dielectric grease may be applied to first outer sealing element 217 and primary lower sealing element 222 to facilitate the sliding of penetrator housing element 300. Penetrator housing element 300 should continue to slide down until it substantially contains both upper assembly 210 and lower assembly 220. As depicted in FIG. 15, primary lower sealing element 222 may have ridges on its exterior surface. When installed over lower assembly 220, there should be minimal distance, if any, between the interior surface of penetrator housing element 300 and these ridges. The witness mark(s) should again be examined to confirm proper component positions have been maintained. Lower penetrator cap 320, which the ESP cables may have been passed through before passing through lower assembly 220, may then be threaded onto lower threaded portion 305 of penetrator housing element 300. In some embodiments, lower penetrator cap 320 may be initially positioned on the ESP cable such that it seats on any remaining armor or drifts slight past the leading edge of any remaining armor prior to being secured to penetrator housing element 300.

Lower penetrator cap 320 may include at least one retention aperture 321 as shown in FIG. 16. Once lower penetrator cap 320 is secured to penetrator housing element 300, the penetrator assembly may be rotated such that two apertures are visible when viewing a central conductor leg from above. The witness mark should again be examined to confirm proper component positions have been maintained.

Shown in FIG. 17, upper sealing element 302 and upper sealing follower 303, which may also have had the external power cables passed through before including the penetrator housing element 300 and upper assembly 210, may then be installed into penetrator housing element 300. Upper sealing element 302 resembles primary lower sealing element 222 in structure but is oriented in the opposite direction. Each nose sealing element 215 may be slid into upper body 211 until they are flush with an upper face 216 of upper body 211.

Dielectric grease may be applied to the outer surfaces of each nose sealing element 215 to facilitate their insertion into upper body 211.

Upper sealing element 302 may then be slid down along the external power cables and into penetrator housing element 300 until it is flush against the upper face 216 of upper body 211. In such a position, the outer ridges depicted on upper sealing element 302 should be contained within penetrator housing element 300 with minimal, if any distance, between the interior surface of penetrator housing element 300 and the ridges. Upper sealing element 302 may be lightly lubricated to facilitate the insertion into penetrator housing element 300. Upper sealing follower 303 is then slid downward and into penetrator housing element 300. Upper sealing following 303 may be configured with a shoulder such that, when installed into penetrator housing element 300, it is not fully inserted into penetrator housing element 300 but is rather supported by an upper annular surface of penetrator housing 300 while leaving upper threaded portion 304 unobscured and capable of engagement with upper penetrator cap 310. Depicted in FIG. 18, upper penetrator cap 310, which may have had the external power cables passed through before passing them through upper sealing element 302 and upper sealing follower 303, is then slid down the external power cables and threaded onto penetrator housing element 300 via upper threaded portion 304 and first threaded portion 311 as shown. In some embodiments, upper penetrator cap 310 may have one or more knurled sections to allow use of channel-lock pliers to tighten it when threaded onto penetrator housing element 300.

Figure 19:
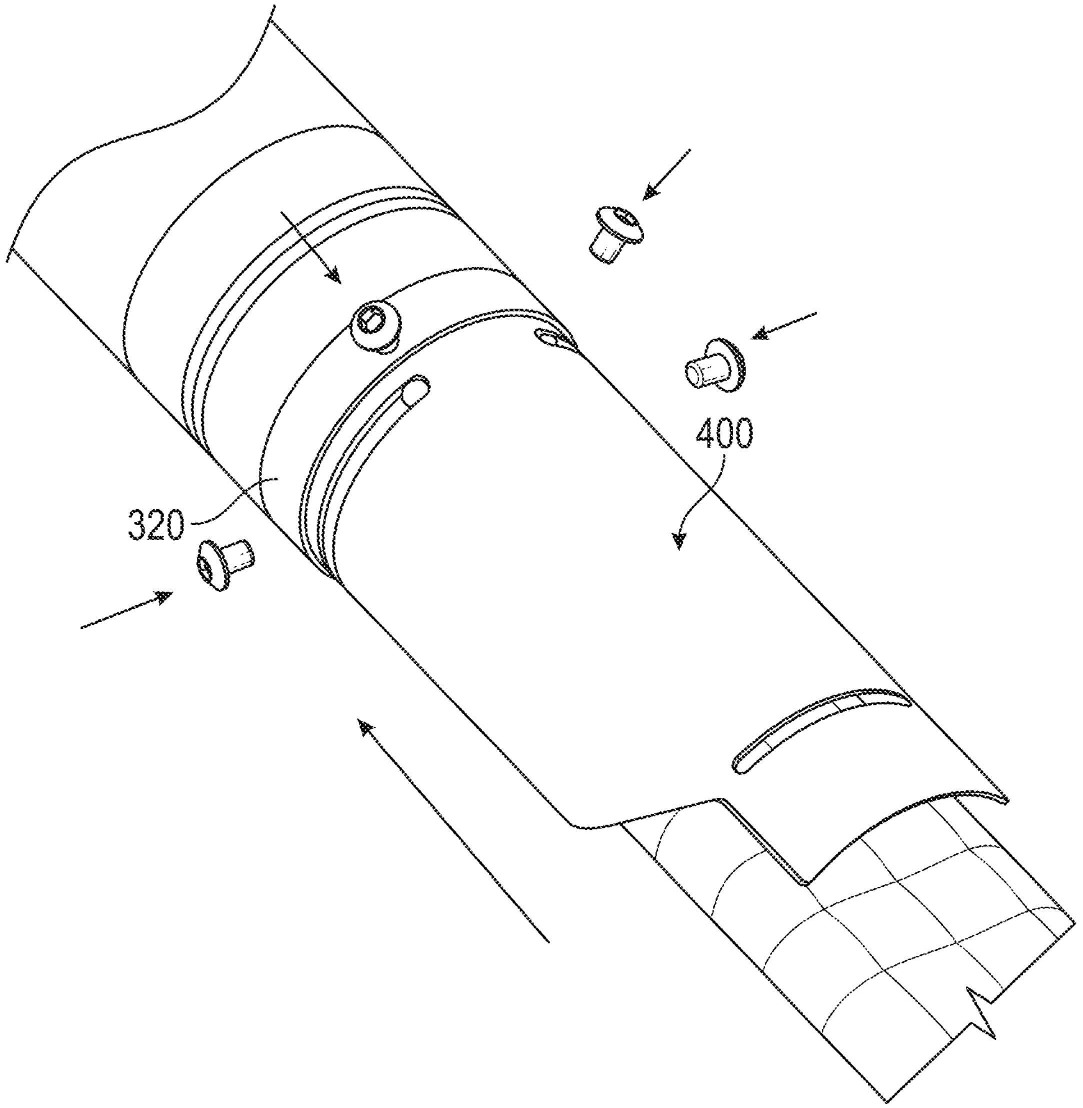
FIG. 19 depicts a perspective view of a lower penetrator cap and a cable protector in accordance with various embodiments of the present disclosure.
Figure 22:
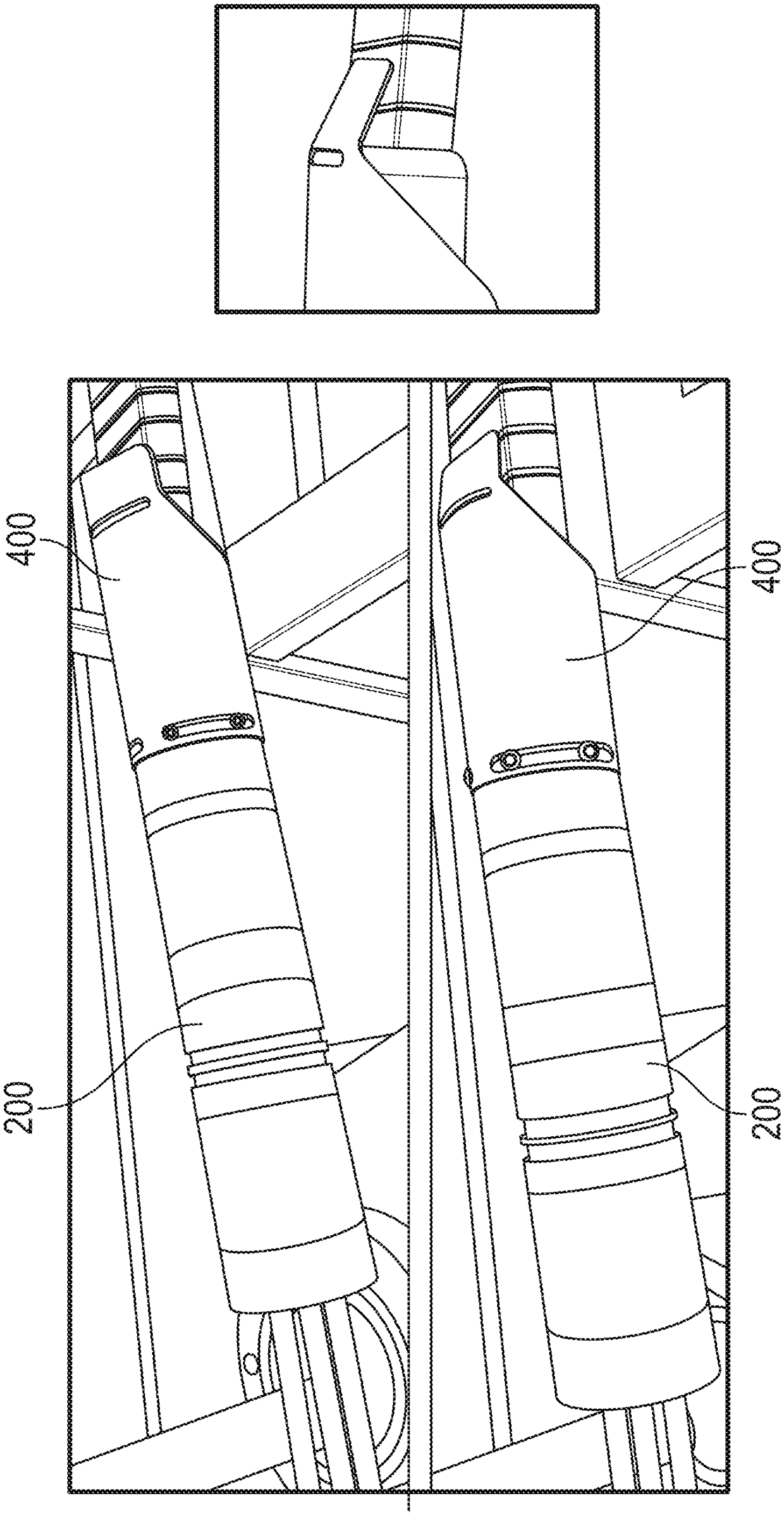
FIG. 22 depicts a side view of a penetrator assembly including a cable protector in accordance with various embodiments of the present disclosure.

In further embodiments, penetrator assembly 200 may further comprise a lower cable protector 400 as shown in FIG. 19. Lower cable protector 400 may be slide over the ESP cable until it fits over lower penetrator cap 320. The gap or shaped section at the lower end of lower cable protector 400 may be rotated such that the exposed portion is facing toward the tubing string. Lower cable protector 400 may include one or more connection slots that may be aligned with the at least one retention aperture 321 of lower penetrator cap 320, When aligned, one or more screws (or other similar retention elements) may be used to secure lower cable protector 400 to lower penetrator cap 320. Lower cable protector 400 may also include a tabbed segment that may be bent by hand as shown in FIG. 22 to facilitate entry of the cable into the wellhead.

Figure 20:
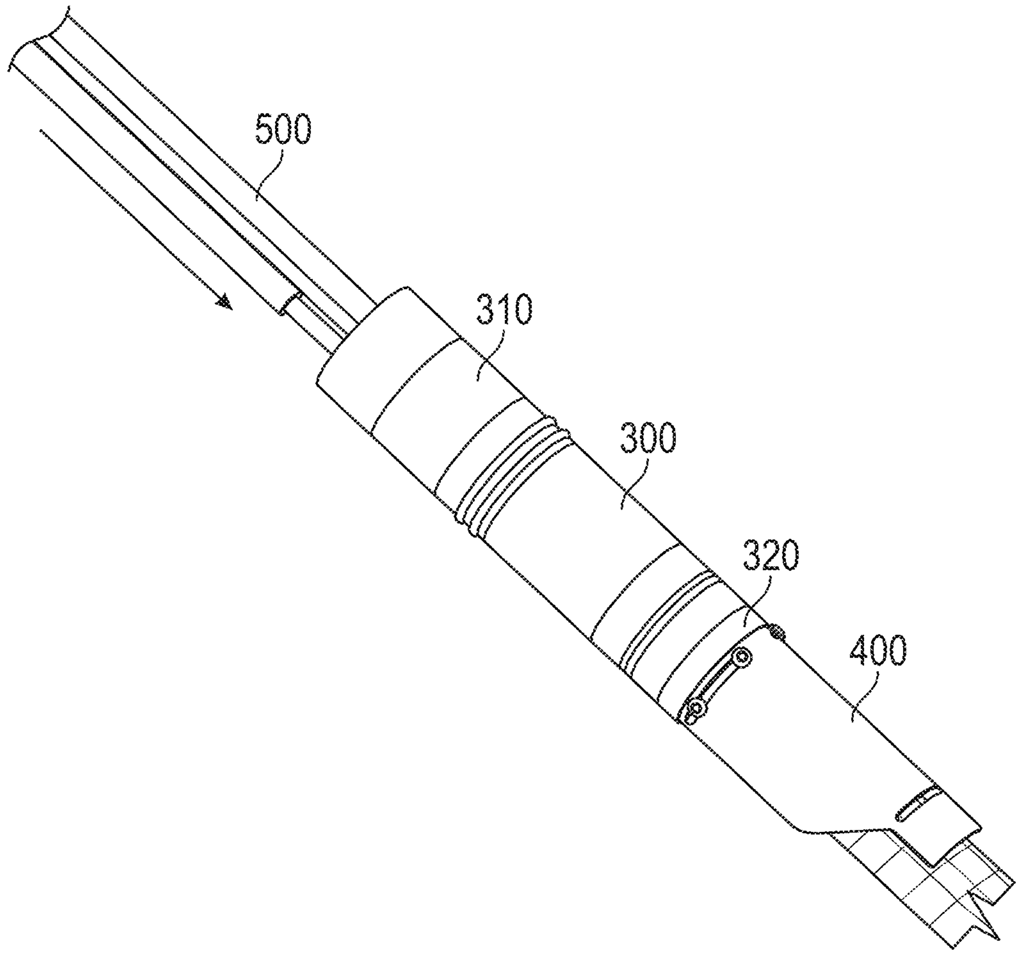
FIG. 20 depicts a side view of a penetrator assembly in accordance with various embodiments of the present disclosure.
Figure 21:
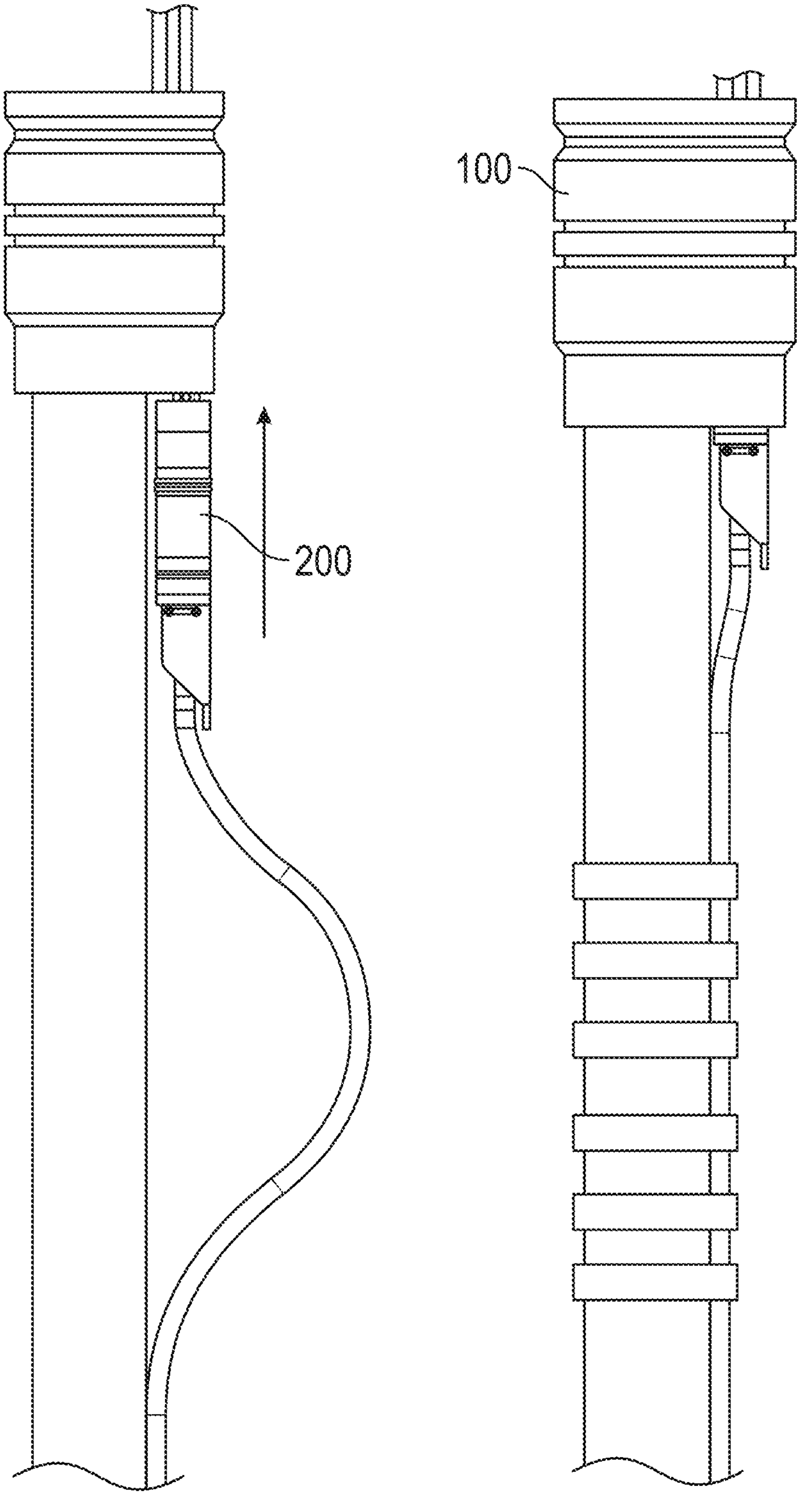
FIG. 21 depicts a side view of a penetrator assembly installation in accordance with various embodiments of the present disclosure.

In some embodiments, one or more protective cable sleeves 500 may be slid over each external power cable 214 until they are seated against upper sealing element 302 as depicted in FIG. 20. Once penetrator assembly 200 is assembled, it can then be installed into the bottom of the feed-thru port within tubing hanger 100 until it shoulders out on an internal edge of tubing hanger 100 as depicted in FIG. 21. To facilitate this installation any secondary outer sealing elements 301 may be lubricated with dielectric grease. The installation may begin with passing wires upward through the tubing hanger and pushing penetrator assembly 200 until it is firmly seated in the feed-thru pocket. Four cable bands may be installed below lower cable protector 400 to secure the ESP cable.

The invention claimed is:

1. A wellhead electrical connector assembly comprising:

a substantially cylindrical outer housing body, said outer housing body being configured to substantially contain a first retention assembly and a second retention assembly, wherein said first retention assembly comprises:

a substantially cylindrical inner housing body:

a primary upper sealing element disposed at a first end of said inner housing body, said primary upper sealing element being configured to receive said at least one of a first set of conductors;

at least one conductor receptacle partially disposed in a second end of said inner housing body, said at least one conductor receptacle being configured to engage with said at least one of a first set of conductors, said at least one conductor receptacle being further configured to engage with at least one of a second set of conductors;

wherein said second retention assembly comprises:

a primary lower sealing element configured to receive said at least one of a second set of conductors; and an upper assembly cap configured to engage with a first end of said outer housing body.

2. The wellhead electrical connector assembly of claim 1 wherein said outer housing body has a first threaded outer housing section, wherein said upper assembly cap has a first threaded inner cap section, said first threaded outer housing section and said first threaded inner cap are configured for threaded engagement with one another.

3. The wellhead electrical connector assembly of claim 1 further comprising a lower assembly cap configured to engage with a second end of said outer housing body.

4. The wellhead electrical connector assembly of claim 1 further comprising at least one outer upper body sealing ring disposed around an outer surface of said inner housing body.

5. The wellhead electrical connector assembly of claim 4 wherein each of said at least one conductor receptacle is configured with an outer receptacle sealing ring disposed around an outer surface of said at least one conductor receptacle.

6. The wellhead electrical connector assembly of claim 1 wherein said at least one conductor receptacle comprises one or more conductor retention elements adapted for reversible engagement between said at least one conductor receptacle and said at least one of a second set of conductors.

7. The wellhead electrical connector assembly of claim 6 wherein said at least one conductor receptacle is at least one lug.

8. The wellhead electrical connector assembly of claim 7 wherein said one or more conductor retention elements is at least one set screw.

* * * * *